US006597670B1

(12) United States Patent
Tweedy et al.

(10) Patent No.: US 6,597,670 B1
(45) Date of Patent: Jul. 22, 2003

(54) METHOD AND SYSTEM FOR DISTRIBUTING SUBSCRIBER SERVICES USING WIRELESS BIDIRECTIONAL BROADBAND LOOPS

(75) Inventors: Ernest P. Tweedy, Lexington, MA (US); Richard M. Weiland, Westborough, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/395,728

(22) Filed: Sep. 10, 1999

Related U.S. Application Data

(63) Continuation of application No. 09/013,428, filed on Jan. 26, 1998.

(51) Int. Cl.[7] .......................... H04B 7/212; H04Q 7/00; H04J 3/00
(52) U.S. Cl. ...................... 370/328; 370/346; 370/349; 370/442; 370/498; 455/12.1
(58) Field of Search ................................ 370/310, 328, 370/319, 339, 327, 330, 331, 346, 347, 349, 442, 443, 498, 499, 486, 522, 532; 455/12.1, 21; 348/552

(56) References Cited

U.S. PATENT DOCUMENTS

| 4,747,160 A | 5/1988 | Bossard ........................ 455/33 |
| 5,485,464 A | 1/1996 | Strodtbeck et al. ......... 370/346 |
| 5,550,825 A | 8/1996 | McMullan, Jr. et al. .... 370/486 |
| 5,768,280 A | 6/1998 | Way ........................... 370/486 |
| 5,828,655 A | 10/1998 | Moura et al. ............... 370/346 |

OTHER PUBLICATIONS

M. Pilgrim et al., The M$^3$VDS Saxmundham Demonstrator—multichannel TV distribution by mm–Waves, Br. Telecom. Technol. J., vol. 7, No.1, Jan. 1989.
Application of Hye Crest Management, Inc. Before FCC, File No. 10380–CF–P–88, released Jan. 18, 1991.

*Primary Examiner*—Hassan Kizou
*Assistant Examiner*—Afsar M. Qureshi
(74) *Attorney, Agent, or Firm*—Leonard Charles Suchyta; James K. Weizel

(57) ABSTRACT

A method and system for distributing subscriber services to a number of user locations in a broadband cellular network. A bidirectional antenna array located at a number of cell centers provides coverage over a wide service area by using wireless distribution loops. The cell centers broadcast subscriber services over designated channels and a user at the subscriber site location commands a centralized mechanism to switch to the channel broadcasting the requested service. The duplication of service channels is minimized and the number of subscribers is maximized by allowing channel selection to occur at various points in the distribution network. Each antenna in the array is configured to provide the subscriber service to a particular service segment. These segments include subscriber location sites with processing equipment to request and receive the services in the form of information programs, data, signaling, etc.

23 Claims, 5 Drawing Sheets

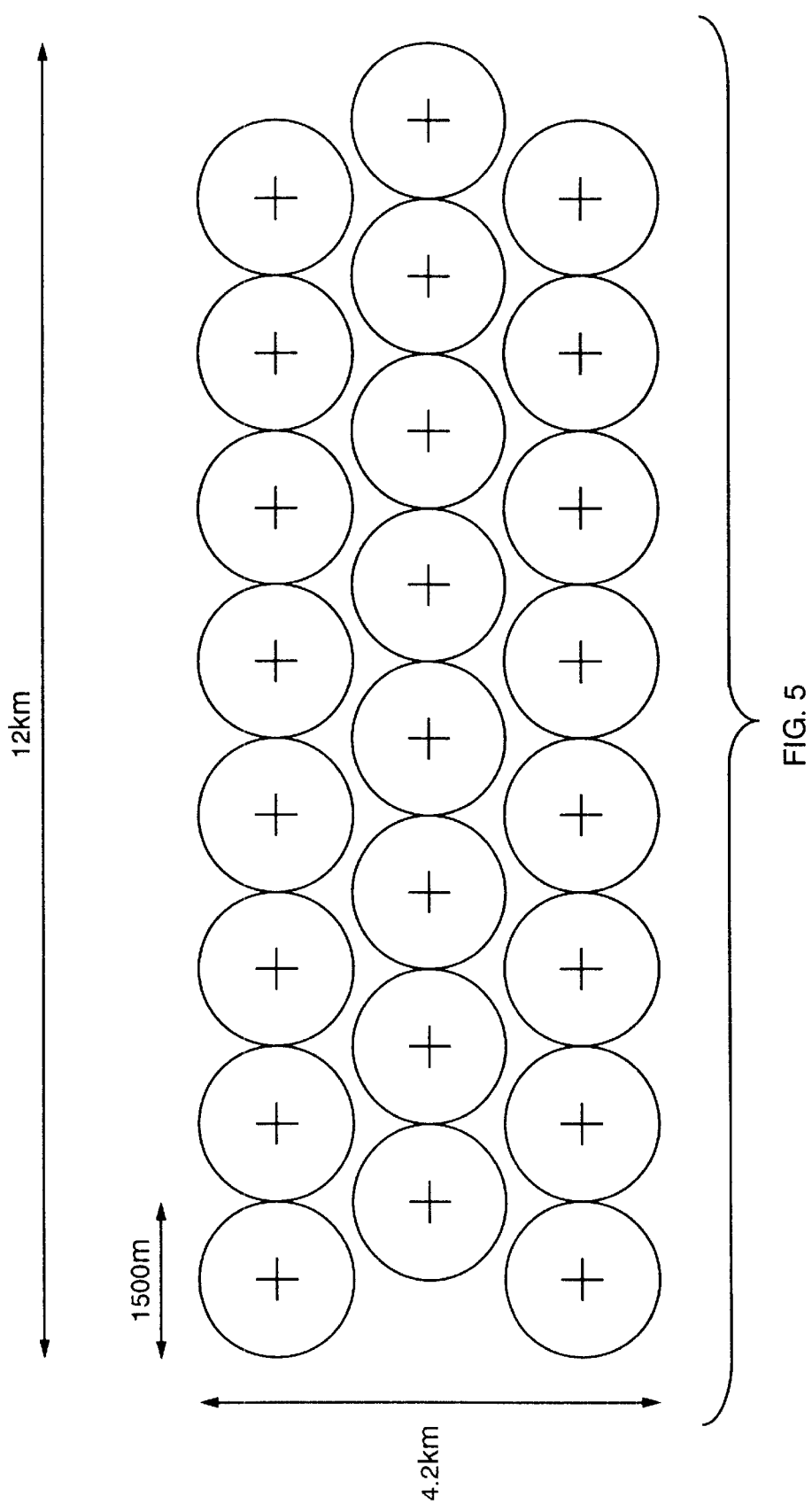

METHOD AND SYSTEM FOR DISTRIBUTING SUBSCRIBER SERVICES USING WIRELESS BIDIRECTIONAL BROADBAND LOOPS

CROSS-REFERENCE TO RELATED APPLICATIONS

This application for patent is a continuation of copending U.S. patent application Ser. No. 09/013,428, filed Jan. 26, 1998, having the same inventor and assignee as herein named, which is incorporated by reference as though fully set forth herein.

BACKGROUND OF THE INVENTION

Generally, the present invention relates to the distribution of subscriber program material, and more particularly to distribution of television program material using wireless broadband loops and a bidirectional antenna array.

Conventionally, the use of wireless communication is restricted to cellular telephone systems for voice and limited data service. Recently, however, wireless communication services are being used for unswitched "broadcast" television distribution. These systems use a cellular structure with each cell transmitting in the direction of potential subscribers. Two of these systems include an early analog approach, referenced in "The $M^3$ Saxmundham Demonstrator-Multichannel TV Distribution by mm-Waves," M. Pilgrim, R. P. I. Scott, R. D. Carver, and B. J. Ellis, British Telecom Tech., J. Vol. 7 No. 1, January 1989, and a digital broadcast approach, Application of Hye Crest Management, Inc. before the FCC, File No. 10380-CF-P-88, released Jan. 18, 1991, the latter being designed to take advantage of highly compressed digital video/audio codecs.

These approaches as well as other more recent developments in television and data signal broadcasting, allow subscribers to select information programs from a set of broadcast program materials. Once selected, a data stream of program material is received by the subscriber in a continuous downstream feed. Video on demand and pay-per-view systems for example, permit users to select a broadcast channel transmitting a movie or other program material for viewing. The channel is selected at the viewer's home, and the program is received at a designated, scheduled time. Conventionally, the downstream data flow is controlled by the distribution source, and the subscriber has little or no input as how the data stream is received. In other words, while the subscriber can request the program material or movie, he cannot start or stop the stream once it has begun. In addition, the subscriber cannot affect the downloading speed or sequence of the downloaded signal. Further, because conventional transmission facilities continually broadcast the material on a given channel, scrambling or blocking techniques are often required to prohibit unauthorized access of the material.

Conventional broadcast systems of this type also do not offer an upstream signaling capability that allow the user to transmit data via the network. If available, this upstream signaling capability could permit subscribers to utilize the high bandwidth transmission rates of a centralized control center for their own personal broadcast. Services, such as desktop video conferencing and home data transmission uplink, could be initiated from the subscriber's location and transmitted using a two-way communication center.

There is therefore a need for an economical approach for distributing a wide range of subscriber services to customers without access to conventional broadband wireline distribution systems. The solution should provide a low-powered, high bandwidth switched service system with the ability to provide the services to a large number of subscribers. The system should give subscribers both upstream and downstream signaling capabilities with control over the downstream program signal once it is requested. Preferably, the solution should also allow subscribers to use the capabilities of the two-way broadcasting center via upstream signaling. Finally, the solution should effectively deny unauthorized access to source material.

SUMMARY OF THE INVENTION

Systems and methods consistent with the present invention permit distribution of subscriber services such as voice, video, and data by using millimeter wireless loops. Systems and methods of the present invention distribute the subscriber services from a cell center to a number of subscriber units. The cell center includes a switch mechanism that changes to a particular channel at the request of the subscriber. The requested service is then downloaded to the subscriber and processed. The cell center also includes a bidirectional antenna array specifically configured to provide coverage for a large number of subscribers. The antenna array includes a number of antenna units with alternate horizontal and vertical transmission modes. Each bidirectional antenna transmits downstream services and receives the upstream signaling requests from the subscriber units.

Specifically, the invention provides a communications system having a headend source of stored information signals coupled to a wideband wireless loop network. The network comprises: a plurality of cell centers each assigned to a subscriber service area including communication device configured to communicate with subscriber units within a designated subscriber service area; a plurality of antennas each dedicated to a segment of the subscriber service area and operable to communicate over a common frequency channel, and wherein the antenna corresponding to adjacent segments of the service area operate in different transmission modes; and a plurality of subscriber units, each unit including a receiver configured to receive a downstream information signal from an antenna, and a transmitter configured to transmit an upstream signal request to an antenna.

In another aspect the invention provides a method for providing subscriber services to a number of subscribers in a wideband wireless loop network having a headend source of stored or transported information signals coupled to a wideband wireless loop network, the network including a plurality of cell centers each providing service to a number of service area segments. The method comprising the steps of: initiating an upstream signal request at a subscriber unit located within a service area segment sending a polling message to subscriber units in the service area segment from a cell center to determine the presence of the upstream information request, wherein the cell center services the service area segment containing the requesting subscriber unit; transmitting, to the cell center, the upstream signal request upon the receipt of the polling message; switching, upon receipt of the upstream signal request, a selection device to a subscriber service channel, wherein the subscriber service channel broadcasts a subscriber service; transmitting the subscriber service, via the selected subscriber service channel, to the requesting subscriber unit in a downstream information signal; and receiving the downstream information signal at the requesting subscriber unit.

The summary and the following detailed description should not restrict the scope of the claimed invention. Both provide examples and explanations to enable others to practice the invention.

BRIEF DESCRIPTION OF THE DRAWINGS

The accompanying drawings, which are incorporated in and constitute a part of this specification, illustrate systems and methods consistent with this invention and, together with the description, explain the principles of the invention.

In the drawings,

FIG. 5 is a geographically segmented layout configuration and coverage area for the wireless cellular loops consistent with the present invention.

DETAILED DESCRIPTION

Figure 1:
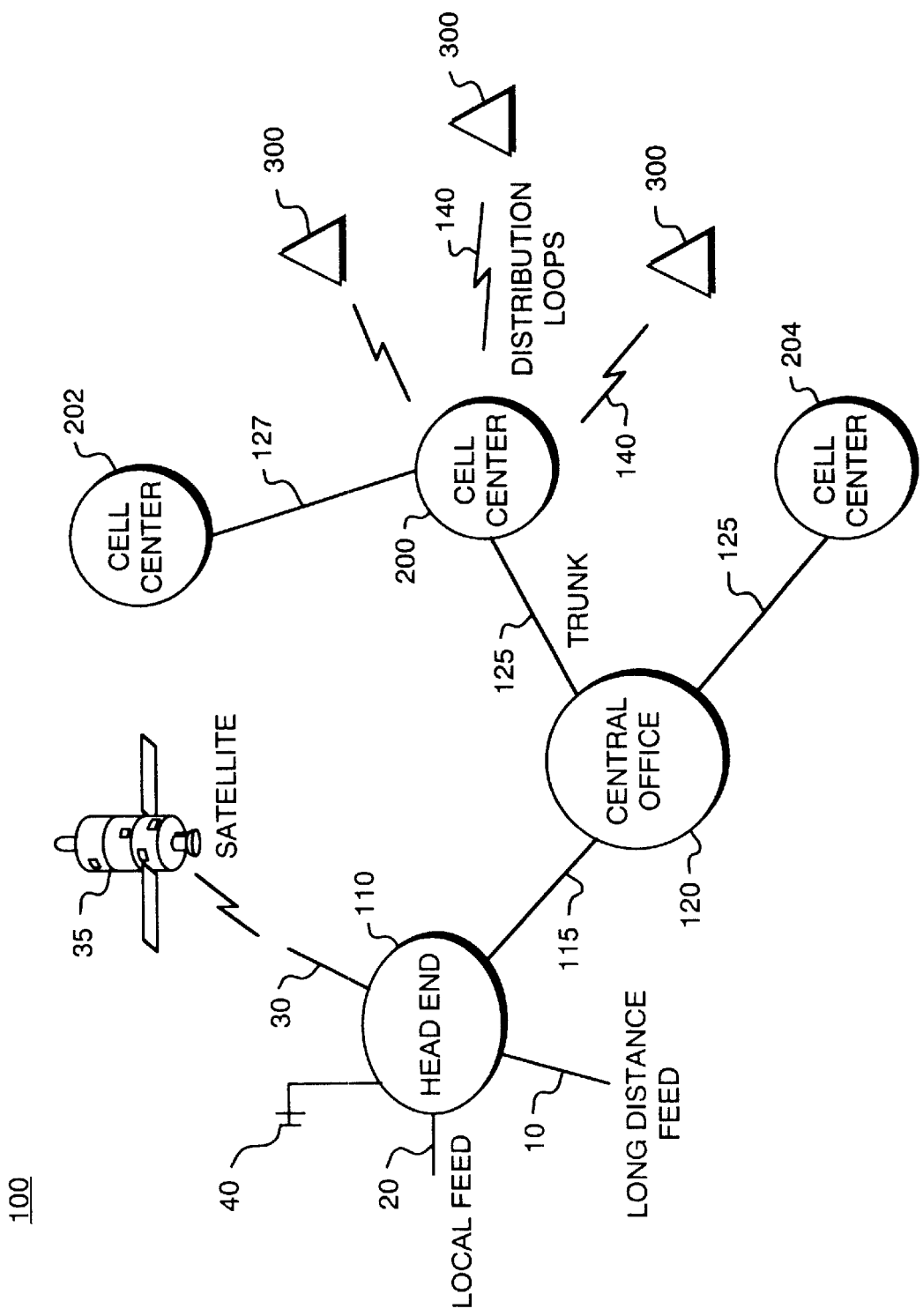
FIG. 1 is a block diagram of a wideband services network configuration using wireless distribution loops consistent with this invention.

The following description of implementations of this invention refers to the accompanying drawings. Where appropriate, the same reference numbers in different drawings refer to the same or similar elements.

Systems and methods of the present invention distribute source information, i.e., video, voice, data, information signals using millimeter wavelength, wireless loops set up between a cell center (CC) and various subscriber locations. Each video program or data source is generated in individual packets and multiplexed to form the downstream transport stream. For video sources, for example, an Moving Picture Experts Group (MPEG) compatible transport stream of 900 Mb/s (two 450 Mb/s channels) is used to download video program data to the subscriber.

The transport stream includes a series of packets each containing data, header, and address information. This approach allows the transport stream to be further divided into a set of time division multiplex (TDM) channels, with one group of TDM channels allocated for high band-width video source signals (4 Mb/s) and another group allocated for lower bandwidth signaling sources (64 Kb/s). Subscriber equipment is configured to capture the source data containing an appropriate address, interpret the header information, and decode the packet data for audio presentation and video display. Further, the addressing and packetization of the data stream allows only that data within a particular time slot to be received by a subscriber, thereby denying access to unauthorized subscribers. Preferably, similar approaches are used for other source data such as signaling, data, digitized phone, fax, video conferencing, etc.

The number of subscribers served by one such downstream transport signal depends upon several factors including, but not limited to, the transmitted data rate, the bit rate per audio/video program channel, the number of subscribers per unit area, the horizontal polar diagram of the antenna transmitting horn, the power of the transmitter coupled to antenna vertical gain, the modulation approach, and the path loss of the antenna that includes a safety factor for atmospheric attenuation. For example, if the transmitted bit rate were 900 Mb/s, the bit rate per channel were 4 Mb/s, and the average subscriber required two simultaneous entertainment channels, approximately 100 subscribers could be supported by one signal transmission. If, however, half the channels were in the broadcast mode, ie., not switched services, then 50 subscribers could be supported with switched services, and an unlimited number of subscribers could be supported with broadcast services.

In the upstream direction, subscribers preferably share a 50 Mb/s channel and signaling is accomplished using a polling approach or by transmitting an upstream message in assigned Time Division Multiple Access (TDMA) timeslots. With the polling approach, the transmitter at the subscriber site initiates a request for a service. Preferably, the subscriber equipment places the initiated request in an output transmitter buffer that is accessible by CC 200. CC 200 polls all the subscribers sites in a given service segment and retrieves the service request stored in the buffer and subsequently processes the service request. Alternatively, one or more TDMA timeslots are assigned to each subscriber, which allows the upstream message to be sent when the assigned timeslot occurs. Upon processing the request, CC switches to an appropriate service channel and the data is downloaded to the subscriber site.

The upstream signal could be an information request signal, requesting a downstream feed of an entertainment program, or a signal requesting a wider-bandwidth upstream channel for transmitting data such as voice and video signals to the CC. Data and voice signals are transmitted upstream at lower bandwidth than the downstream service signal and the actual transmission rate depends upon the type of service transmitted. Preferably, upstream signaling operates over a fraction of a 50 MHz upstream bandwidth, ie., 1 MHz.

A. System Equipment

FIG. 1 is a wideband configuration for a distribution network 100 using wireless broadcast loops consistent with the present invention. Distribution network 100 includes headend source 110 connected to a central office 120 via trunk 115. Wideband communication trunk 125 connects central office 120 to a CC 200 and also connects CC 120 to other CCs such as CC 204. CC 200 is also coupled to other CCs such as CC 202 via trunk 127. Distribution network 100 also includes subscriber units 300 each coupled to CC 200 and receiving requested source material via wireless distribution loops 140.

It is assumed that all source material is digitized, compressed, and multiplexed before entering network 100. Preferably, digital video/audio NTSC television material entering network 100 is compressed to about 4 Mbs$^3$ in accordance with Moving Picture Experts Group (MPEG) international standard, MPEG-2 for NTSC/PAL/SECAM formats. In addition, higher data rates can be included for High Definition TV (HDTV) or lower rates may be considered for less demanding services (i.e., video conferencing, video phone). Headend device 110 receives source material such as telephone, data signal, information, audio/visual programs or other like information media from external locations such as long distance signal feed 10, local feed 20, satellite 35 and satellite signal receiver 30, broadcast receiving antenna 40, etc.

Communication trunk line 125 couples central office device 120 to CC 200, a distribution center for transmitting or broadcasting telephone, data, and information signals to subscriber units 300 via distribution loops 140. Subscriber units 300 have upstream signaling capabilities that permit each subscriber location to request source material from CC 200 and transmit upstream signal data to CC 200. When a source material request is received by CC 200, it switches to an appropriate channel and downloads the material to subscriber unit 300. Preferably, each subscriber unit 300 is assigned an address used by CC 200 to identify the source of the request. Once received, the requested material is decoded and displayed by equipment located at subscriber unit 300.

For switched services, such as audio/video material, the selection apparatus, or switch, for responding to a subscriber unit's 300 request is preferably located at CC 200. Alternatively, the selection device for other, less frequently accessed, services could be located in central office 120 or headend device 110. This alternative approach reduces the need for expensive bandwidth capabilities on trunk lines 115 and 125, while still giving subscribers access to a wide range of source material.

Figure 2:
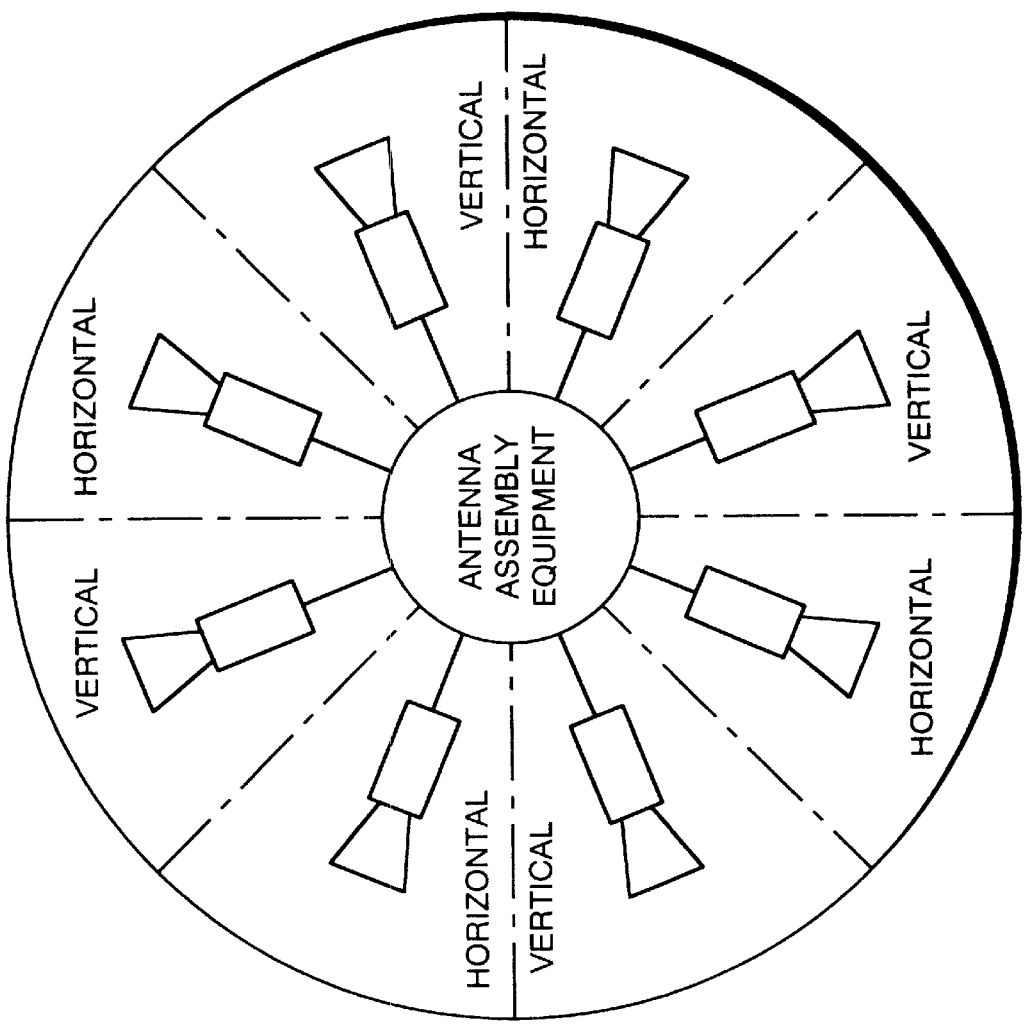
FIG. 2 is a block diagram of a segmented cell antenna array consistent with the present invention.

FIG. 2 is a block diagram showing an antenna array assembly 205 located at CC 200. FIG. 2 shows a configuration employing eight bidirectional antennas with each antenna connected to an individual transmitter and receiver (not shown). Preferably, the antenna array configuration permits service to a large area of subscriber sites by segmenting the service area in accordance with the coverage capabilities of each antenna assembly. The frequency pair used in each antenna is the same, but adjacent antennas operate in opposite transmission modes to avoid interference with their neighboring antennas. Antenna array 205 shows a collection of four vertical and four horizontal polarization antenna segments, alternating between vertical and horizontal polarization signal transmission modes. Alternatively, right and left circular polarization could be used. Preferably, the subtended angle of each antenna segment is selected to accommodate the maximum number of subscriber sites that can be served by a single transmitter site. For example, in the present embodiment, the eight segment antenna array allows for a subtended transmission angle of 45 degrees.

B. Antenna Components

Figure 3:
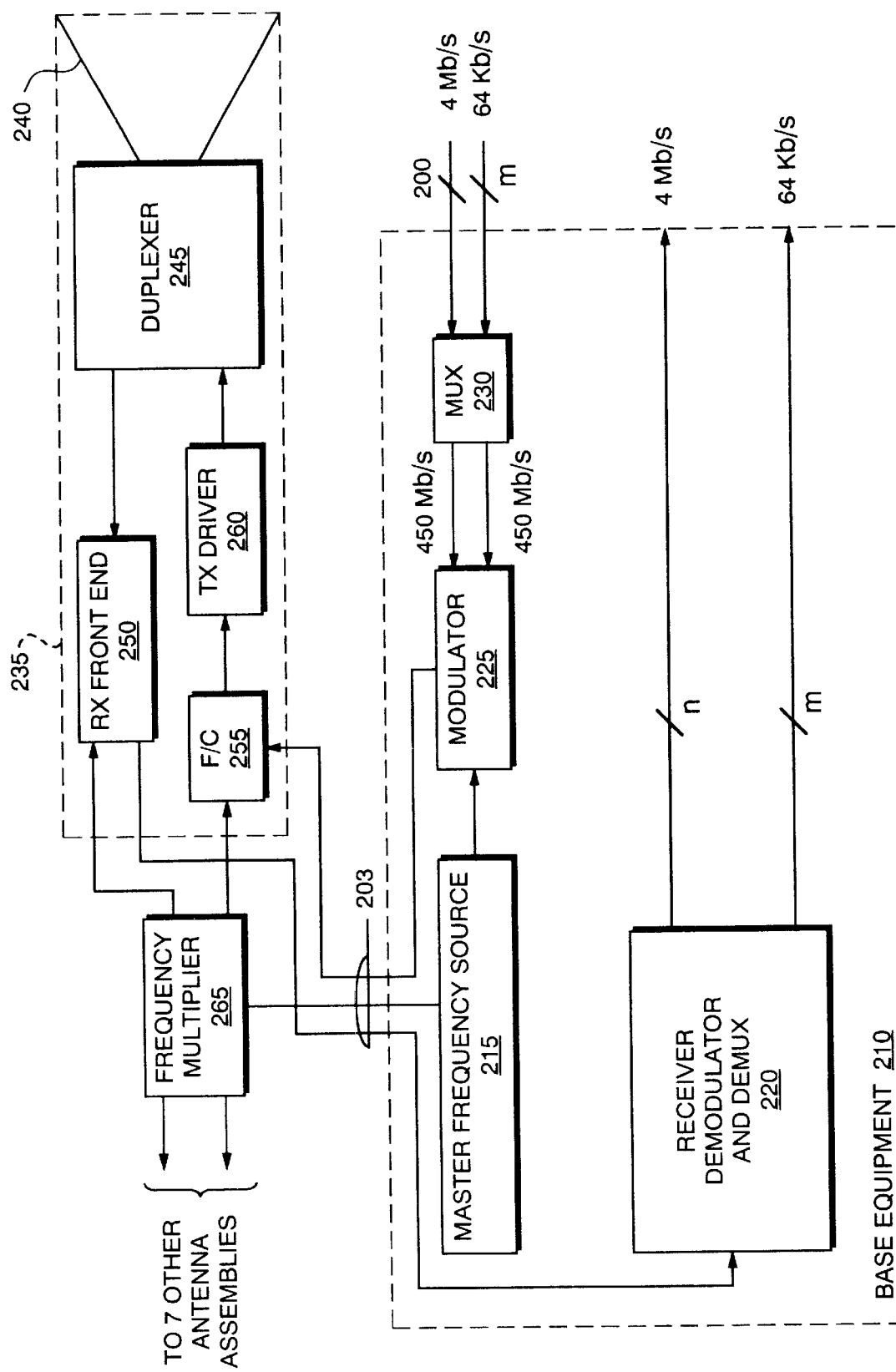
FIG. 3 is a block diagram of the components of a cell center consistent with the present invention.

FIG. 3 is a block diagram showing the components associated with each antenna segment in antenna array 205 of FIG. 2. The components of CC 200 are basically divided in two categories, base equipment 210 and antenna assembly 235. In addition, each segment includes frequency multiplier 265 that also supplies all relevant frequencies to the other seven segments in the array. Coaxial cables 203 are used to connect base equipment 210 located at the base of the antenna mast up to antenna assembly 235. Alternatively, waveguides are used to link the two sections if millimeter wave modulators are used at the base.

Base equipment 210 includes a master frequency source 215, a receiver (RX) demodulator and demultiplexer 220, and a modulator 225 driven by two time division multiplexed (TDM) source signals via multiplexer 230. Preferably, multiplexer 230 is driven by a multiplexed 200 channel video source (i.e., 4 Mb/s each), and m number of 64 Kb/s channels. Multiplexer 230 outputs two 450 Mb/s data streams and, in turn, feeds these two streams to modulator 225. In this example, modulator 225 is a quadrature phase-shift key (QPSK) modulator; however, the present invention envisions using any type of modulation scheme such as CAP, DPCM, or 8PSK.

Antenna assembly 235 includes multiples of a nine inch horn 240, a duplexer 245, a front end receiving (RX) unit 250, a transmitter frequency changer (F/C) 255, and a transmitter (TX) driver device 260. Master frequency source 215 is coupled via frequency multipliers 265 to F/Cs in all the other antennas in antenna array assembly 205. Master frequency source 215 is the origin of all frequencies required to operate the system including the carrier and local oscillator frequency sources. Again, the present invention contemplates using any number modulation approaches including QPSK, 8PSK, or MSK, etc. In the example shown, QPSK is selected for the downstream traffic with a total multiplexed rate of 0.9 Gb/s and an operating bandwidth of about 500 MHz.

Duplexer 245 separates the upstream from the downstream carrier signals. This separation permits the unit to function both as a downstream transmitter and an upstream signal receiver. In the present preferred embodiment, downstream signaling is the signal or data transmission from CC 200 to subscriber unit 300, while upstream signaling is the data transmission from subscriber unit 300 to CC 200. Upon receiving the upstream signal, RX front end unit 250 converts the 30 GHz carrier signal to an intermediate frequency (IF) (i.e., 3 GHz) for transmission to base equipment 210. Downstream signals are sent on the IFs from base equipment 210 to F/C 255 and TX driver 260 which amplifies the signal and forwards it for transmission to duplexer 245 and on to antenna horn 240.

C. Subscriber Unit

Figure 4:
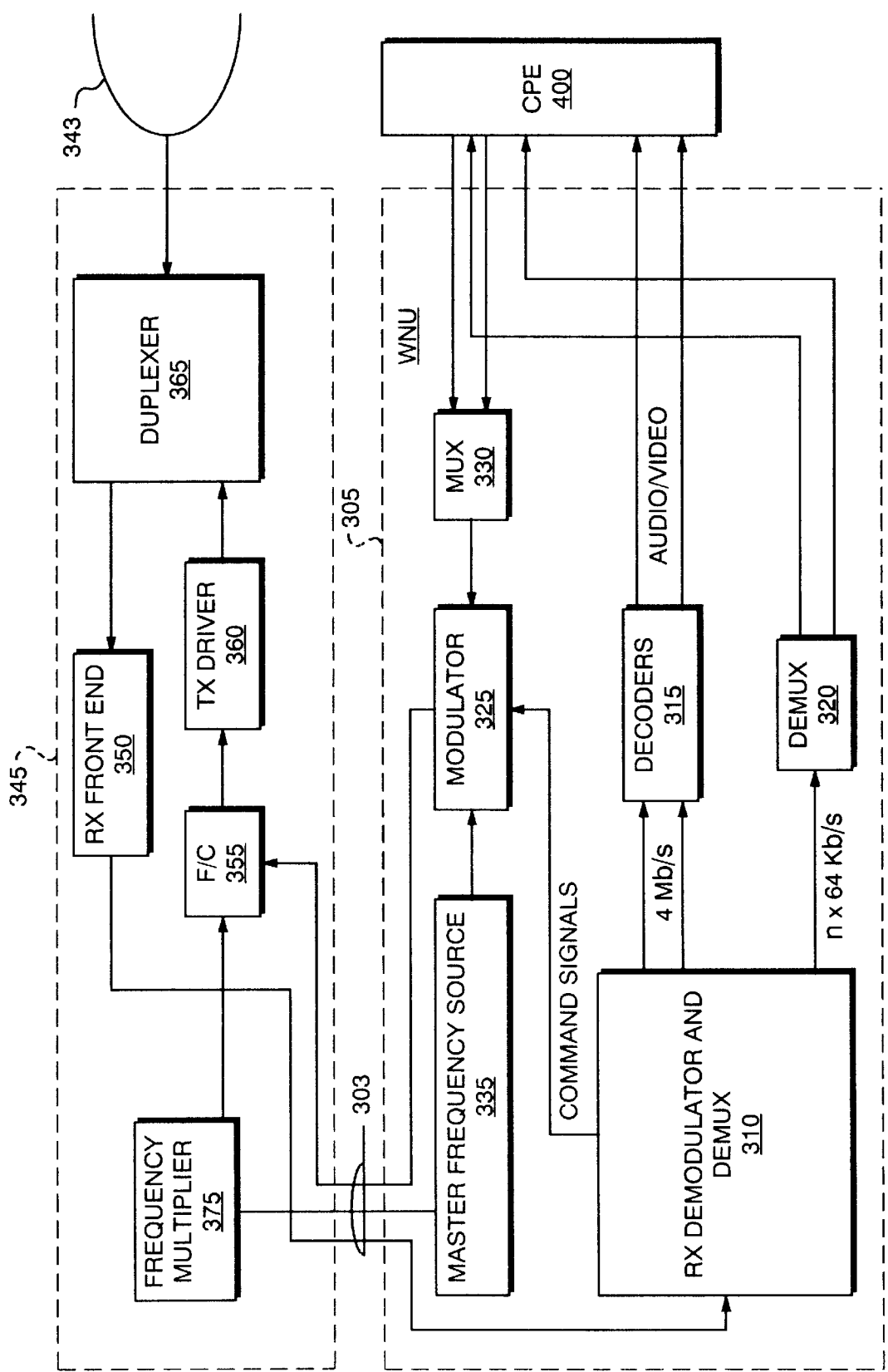
FIG. 4 is a block diagram of the components of subscriber unit consistent with the present invention.

FIG. 4 is a block diagram of the components of subscriber unit 300 residing at a subscriber site location consistent with the present invention. Subscriber unit 300 includes a wireless network unit (WNU) 305 that is coupled to a roof-top assembly 345 via coaxial cable 303.

WNU 305 includes a receiver (RX) demodulator and demultiplexer 310, one or more audio/video decoders 315 (depending on the number of television sets serviced), demultiplexer 320, a modulator 325, a signal multiplexer 330, and a master frequency source 335. WNU 305 receives upstream source input requests from and delivers downstream source material to customer premises equipment (CPE) 400. In this example, CPE 400 includes the components needed by the subscriber to utilize the requested source material. This equipment may include, but is not limited to, electronic devices such as televisions, computer monitors, telephones, facsimile machines, audio receivers, etc.

RX demodulator and demultiplexer 310 identifies and selects particular time slots or packets from the downloaded transport stream. The identified slots or packets are separated by RX demodulator and demultiplexer 310 into two output signals, one for audio/visual channels and the other for a set of multiplexed data channels. The 64 Kb/s data channels are further demultiplexed by demux 320, using identifiers contained in the packet's header information. The demuxed 64 Kb/s channels are forwarded to CPE 400 for processing by the appropriate CPE 400 component (i.e., telephone, data, fax, narrow band audio/video conferencing, and signaling). RX demodulator and demultiplexer 310 also communicates standard command signals to modulator 325. Decoders 315 provide audio/video analog channels (i.e., NTIA television) for connection to the associated CPE 400 equipment, namely television tuner/receiver units. Preferably, if the subscriber site has two television sets, WNU 305 would contain at least two audio/video decoders, which, in turn, may be MPEG-2 compatible.

For upstream signaling, CPE 400 upstream data (ie., signaling, telephone, fax, data, narrow-band video conferencing, etc.) is preferably generated in identifiable packets with appropriate header and addressing information. These packets are multiplexed in mux 330 and held in a buffer (not shown) until processed by modulator 325. As described above, the modulator 325 is periodically activated, or polled, by control signals from CC 200 and the buffer holds the upstream data packets until the information is requested by CC 200. Alternatively, the subscriber is assigned a TDMA timeslot and the information packet is retrieved from the subscriber when the assigned timeslot is reached in the data stream. Upon the receipt of the control signals from CC 200, modulator 325 empties the buffer and forwards the packet or packets to a rooftop assembly. Modulator 325 is preferably a QPSK modulator to match modulator 225 in base equipment 210. Alternatively, if the polling approach is not used, the packets are held until the TDMA timeslot assigned the particular subscriber, or CPE 400, is received.

The rooftop assembly includes a module 345 coupled to a small antenna 343 (i.e., 1-foot diameter reflector). Module 345 includes a receiver (RX) front end 350, frequency converter (F/C) unit 355, a transmitter (TX) driver 360, a duplexer 365, and a frequency multiplier 375. Together, F/C unit 355, TX driver 360, and duplexer 365 operate as an upstream signal transmitter that has an IF and local oscillator input. Preferably, the local oscillator input is derived from the downstream carrier signal generated by master frequency source 335 contained in WNU 305. RX front end 350 is coupled to WNU 305 via an IF frequency output that is output through coaxial connection 303. Preferably, DC power is provided to rooftop assembly 340 through two of the three conductors in coaxial connection 303.

Components in the subscriber site rooftop assembly 385 operate in the same manner as those of CC 200's antenna assembly 235.

D. Signal Transmission

Systems and methods consistent with the present invention permit information and signal communication over a wide coverage area. The directional antenna array described in the context of FIGS. 2 and 3 permits broadcast of downstream information program material to a plurality of home-based subscriber units upon the request of an upstream signal request. The directional antenna array and the segmentation of the service areas permits a large number of subscriber sites to be serviced by each CC. In addition, upstream signals may be transmitted from the subscriber unit and distributed with the two-way transmitter/receiver residing in the CC.

The following summarizes the steps performed to complete an information request and download a video/audio information program. First, a user selects a television channel using a key pad or other selection device. Next, this selection is combined with a packet identifier that includes header and address data, together which identify the type of CPE and particular subscriber requesting the information program. The packet is held in a buffer location of mux 330 until requested by CC 200. CC 200 periodically polls the subscriber sites in its particular service segment by sending command signals to modulator 325. These command signals, in turn, instruct modulator 325 to obtain the packet from the buffer and process it for transmission to CC 200 via the rooftop assembly 385 and antenna horn 343.

Upon receipt of the service request packet, CC 200 processes the signal and switches to the channel broadcasting the requested information program. Preferably, the selected program has previously been assigned to a broadcast channel, and therefore once the switching process occurs, the program information signal is downloaded to the subscriber site by the transport stream previously described. The switching apparatus is preferably located at CC 200; however, in the alternative, it may be located at central office 120 or headend device 110. This feature reduces the bandwidth requirement on trunk lines 115 and 125. In addition, switched broadcast channels allow for the transport of an unlimited number of-programs from headend 110 to CPF 400. Further, conventional CATV distribution systems are limited because the switching functions reside at the CPE and therefore each channel must be sent to all the subscribers within the system. The present preferred embodiment eliminates this limitation by placing the channel switching mechanism throughout distribution network 100 including at headend 110, central office 120, and CC 200.

FIG. 5 is a geographically segmented layout configuration and coverage area for the wireless cellular loops consistent with the present invention. FIG. 5, in conjunction with the following example, demonstrates that by creating and analyzing a model meeting the predicted service needs of subscribers, the approach of the present invention can provide adequate service. One modeling approach is based upon the coverage provided by remote line units (RLU) of a telephone network and apply the data to a cellular architecture system.

A RLU provides service for up to 750 homes. The maximum local loop length is in the range of 2000 ft to 5000 ft (670 m to 1700 m). Therefore, the area covered by any particular RLU is in the range of $1.4 \times 10^6$ to $9.1 \times 10^6$ m. This means that the density of homes lies in the region of 121/km$^2$ to 536/km$^2$ and thus, each home can be allocated an area from 1,900 to 12,000 m$^2$ (ie., between 130 ft$^2$ and 330 ft$^2$).

It should be noted that the following assumptions were made regarding the values of certain network parameters. These assumptions include:

1. Maximum path distance=870 meters.
2. Transmitted carrier=30 GHz.
3. QPSK Modulation.
4. Transmitted bit rate=900 Mb/s (2×450 Mb/s).
5. RF Bandwidth=0.5 GHz.
6. Compressed digital video/audio=4 Mb/s (MPEG-2).
7. Number of switched digital channels=200 (allowing for overheads and voice/data).
8. Half the subscribers use the switched channels.
9. Average number of video/audio channels per home=2.

Based upon the housing density, the total number of switched video/audio channels required is:

$$\pi \times 750^2 \times 2/(12{,}000 \text{ or } 1900)\text{m}^2 = \text{from 300 to 1900 channels} \quad (1)$$

Therefore, the needed number of segments is from 300/200=2 to 1,930/200=10 or between 180 degrees and 36 degrees per segment.

With a segmentation of 45 degrees and a maximum free-space distance of 0.9 Km, the area of one segment is:

$$\pi \times 800^2/8 = 2.5 \times 10^5 \text{ m}^2 \quad (2)$$

The number of subscriber sites served equals 100 and the area per subscriber site is $2.5 \times 10^5/100 = 2500$ m$^2$.

A line-of-sight path between a cell antenna and a subscriber site antenna is also essential to the above analysis. In addition, "shadow" areas may be covered by low-powered repeater sites appropriately distributed, or alternatively possibly making use of wire or fiber drops. It may prove necessary in some cases for an additional RF carrier frequency to be available when polarization protection is not feasible, for example, near the border between two segments. A transmission path analysis reveals the feasibility of the disclosed cellular approach and additional assumptions are made regarding the path components. The cell 45-degree antenna is assumed to have a vertical angle of 12 degrees and a gain of 21 dBi which can be expected from an economical horn design. The receiving antenna dish is assumed to be ⅓ meter in diameter with a gain of 36 dB with a 2.5 degree beam width. The receiver noise figure is assumed to be 6 dB, and a safety factor of 20 dB is assumed that includes rain attenuation. With these assumptions, the required transmitter power is below 400 mW. Tables 1–3 show the parameters used in the analysis.

TABLE 1

Parameter Variables

| | | |
|---|---|---|
| Transmitter Carrier Frequency (F) | 30.00 | GHz |
| Transmitted Signal Bandwidth (BW) | 0.50 | 6Hz |
| Transmitter Antenna Beamwidth (TXANTBW) | 45.00 | deg |
| Receiver Diameter (D) | 0.33 | meters |
| Path Length (PL) | 0.90 | Km |
| Carrier-To-Noise Ratio | 15.00 | DB |
| Rain Attenuation (RAT) | 20.00 | DB |
| Receiver Noise Figure (NF) | 6.00 | DB |
| Thermal Noise Power Density (No) | −204.00 | DBW/Hz |

TABLE 2

Computations and Results

| | | |
|---|---|---|
| Transmitter Antenna 1 Gain, Lower Cost (TAG) | 16.00 | DB |
| Transmitter Antenna 2 Gain, Higher Cost | 24.00 | DB |
| Receiver Antenna Gain (RAG) | 36.99 | DB |
| 3-DB Antenna Beamwidth | 2.32 | degrees |
| Receiver Noise | 864.51 | DEG K |
| Free Space Loss (FSL) | 121.10 | DB |
| Path Loss, Antenna Gains, & RAT (PTHL) | 88.10 | DB |
| Path Loss with Antenna 2 Gain | 80.10 | DB |
| Receiver Noise in Selected BW | −111.01 | DBW |
| Received Signal Power | −96.01 | DBW |
| Transmitter Power (TX. Antenna 1) | −7.91 | DBW |
| Transmitter Power (TX. Antenna 2) | −15.91 | DBW |

TABLE 3

Formulas

| | |
|---|---|
| Transmitter Antenna Gain | 17.08 + 20 log(F) + 20 log(Antenna Dia.) |
| Free Space Loss (DB) | 96.6 + 20 log(F) + 20 log(PL/1.609) |
| Receiver Antenna Gain (DB) | 17.08 + 20 log(F) + 20 log(D) |
| Receiver Antenna Beamwidth | 22.97/(F × D) Degrees |

The specification does not limit the invention. Instead it provides examples and explanations to allow persons of ordinary skill to appreciate different ways to practice this invention. The following claims define the true scope and spirit of the invention.

We claim:

1. A network, comprising:
  a headend, the headend configured to select source material feeds of which at least two are selected from a local feed, a long distance feed, a broadcast feed and a satellite feed, the source material feed being digitized, compressed and multiplexed;
  a central office operatively coupled to the headend via a wideband communications trunk;
  a plurality of cell centers operatively coupled to the central office via a plurality of wideband communications trunks; and
  a plurality of subscriber units each of which is adapted for electrical communication with a cell center of the plurality of cell centers via wireless distribution loops, each of the plurality of subscriber units configured to signal the cell center of the plurality of cell centers to request source material obtained from the at least two of the source material feeds selected; and
  the cell center configured to download the source material requested to a subscriber unit initiating the request, the source material downloaded using a portion of a wireless distribution loop of the wireless distribution loops, the wireless distribution loop portion using a millimeter wavelength carrier signal.

2. The network of claim 1, wherein the source material comprises digital video/audio National Television Standards Committee (NTSC) television material compressed in accordance with an Motion Pictures Experts Group (MPEG) standard.

3. The network of claim 1, wherein the source material comprises high definition television material.

4. The network of claim 1, wherein the source material comprises video conferencing material.

5. The network of claim 1, wherein the source material comprises data.

6. The network of claim 1, wherein each of the plurality of subscriber units is assigned an address to identify the subscriber unit initiating the request.

7. The network of claim 1, wherein at least a portion of the plurality of cell centers are operatively coupled to one another via at least one of the plurality of wideband communication trunks.

8. A network, comprising:
  a headend, the headend configured to select at least one source material feed;
  a central office operatively coupled to the headend via a wideband communications trunk;
  a plurality of cell centers operatively coupled to the central office via a plurality of wideband communications trunks, each of the cell centers having an antenna array, the antenna array comprising a plurality of antenna assemblies, each of the antenna assemblies covering a portion of a service area;
  a plurality of subscriber units operatively coupled to a cell center of the plurality of cell centers via wireless distribution loops, each of the plurality of subscriber units configured to signal the cell center of the plurality of cell centers to request source material; and
  the cell center configured to download the source material requested to a subscriber unit initiating the request, the source material downloaded over a wireless distribution loop portion of the wireless distribution loops using a millimeter wavelength carrier signal.

9. The network of claim 8, wherein the source material feed is selected from a local feed, a long distance feed, a broadcast feed and a satellite feed.

10. The network of claim 9, wherein the source material feed is digitized, compressed and multiplexed.

11. The network of claim 8, wherein the antenna assemblies adjacent to one another operate in different transmission modes.

12. The network of claim 11, wherein a portion of the antenna assemblies operate in a vertical polarization signal transmission mode, and another portion of the antenna assemblies operate in a horizontal polarization signal transmission mode.

13. The network of claim 11, wherein a portion of the antenna assemblies operate in a right circular polarization signal transmission mode, and another portion of the antenna assemblies operate in a left circular polarization signal transmission mode.

14. The network of claim 11, wherein each of the antenna assemblies use a subtended angle directed to maximize the plurality of subscriber units which may be served by each of the cell centers.

15. The network of claim 8, wherein each of the antenna assemblies comprises:
   a frequency multiplier; and
   an antenna subassembly operatively coupled to the frequency multiplier, the antenna subassembly comprising a receiver front end, a frequency changer, a transmitter, a duplexer and a horn, the duplexer configured to separate upstream and downstream carrier signals, wherein the antenna subassembly functions as both a downstream signal transmitter and an upstream signal receiver.

16. The network of claim 15, wherein the antenna array comprises:
   a master frequency source operatively coupled to the frequency multiplier;
   a modulator operatively coupled to the master frequency source and to the frequency changer;
   a multiplexer operatively coupled to the modulator;
   a receiver demodulator and demultiplexer operatively coupled to the receiver front end; and
   the multiplexer and the receiver demodulator and demultiplexer operatively coupled to one of the plurality of wideband communications trunks.

17. A network, comprising:
   a headend, the headend configured to select at least one source material feed;
   a central office operatively coupled to the headend via a wideband communications trunk;
   a plurality of cell centers operatively coupled to the central office via a plurality of wideband communications trunks, each of the plurality of cell centers having an antenna array, the antenna array comprising a plurality of antenna assemblies, each of the plurality of cell centers disposed within an associated service area, each of the plurality of antenna assemblies covering a portion of the associated service area;
   a plurality of subscriber units operatively coupled to a cell center of the plurality of cell centers via wireless distribution loops, each of the plurality of subscriber units configured with a first bidirectional antenna to signal the cell center to request source material and to receive the source material requested; and
   the cell center configured with a second bidirectional antenna to receive the request and to download the source material requested over a wireless distribution loop to a subscriber unit initiating the request.

18. The network of claim 17, wherein the cell center and the subscriber unit communicate over the wireless distribution loop using a millimeter wavelength carrier signal.

19. A network, comprising:
   a plurality of cell centers, each cell center of the plurality of cell centers having an antenna array and disposed within a designated service area;
   the antenna array comprising a plurality of antenna assemblies, each of the antenna assemblies covering a portion of the designated service area associated with a cell center of the plurality of cell centers;
   a plurality of subscriber units operatively coupled to the cell center via wireless distribution loops corresponding to the antenna assemblies, each of the plurality of subscriber units configured to provide a first time division signal to the cell center to request source material; and
   the cell center configured to download the source material requested to a subscriber unit initiating the request, the source material downloaded using a second time division signal, the second time division signal provided over a wireless distribution loop of the wireless distribution loops.

20. The network of claim 19, wherein the cell center and the subscriber unit communicate over the wireless distribution loop using a millimeter wavelength carrier signal.

21. A network, comprising:
   a cell center, the cell center having an antenna array, the antenna array comprising antenna assemblies, each of the antenna assemblies covering a portion of a service area;
   subscriber units each of which is adapted for electrical communication with a cell center via respective wireless distribution loops, each of the subscriber units configured to signal the cell center to request source material; and
   the cell center configured to download the source material requested to a subscriber unit initiating the request, the source material downloaded over one of the wireless distribution loops using a millimeter wavelength carrier signal.

22. A network, comprising:
   cell centers, each of the cell centers having an antenna array, the antenna array comprising antenna assemblies, each of the antenna assemblies covering a portion of a service area;
   subscriber units operatively coupled to the cell centers via respective wireless distribution loops; and
   each of the cell centers configured to download source material requested to a subscriber unit initiating a request therefor, the source material downloaded over one of the wireless distribution loops using a millimeter wavelength carrier signal.

23. A network, comprising:
   a plurality of cell centers operatively coupled to one another via a wideband communications trunk, each of the cell centers having an antenna array, the antenna array comprising a plurality of antenna assemblies, each of the cell centers disposed within an associated service area, each of the antenna assemblies covering a portion of the associated service area, the antenna assemblies comprising:
   a frequency multiplier;
   a plurality of antenna subassemblies operatively coupled to the frequency multiplier, the antenna subassemblies each comprising a first receiver, a first transmitter, a first antenna and a first duplexer, the first duplexer configured to separate upstream and downstream carrier signals, wherein the antenna subassemblies function as both a downstream signal transmitter and an upstream signal receiver;
   a plurality of subscriber units operatively coupled to a cell center of the plurality of cell centers via wireless distribution loops, each of the plurality of subscriber units configured to signal the cell center to request source material, each of the plurality of subscriber units comprising:
- a wireless network unit for operatively coupling to customer premises equipment;
- a receiving and transmitting unit having a second receiver, a second transmitter, a second antenna and a second duplexer, the receiving and transmitting unit configured to function as both a downstream signal receiver and an upstream signal transmitter; and the cell center configured to transmit the source material requested using at least a portion of the antenna array to a subscriber unit initiating the request.

* * * * *